United States Patent
Schuenemann et al.

(10) Patent No.: US 11,691,520 B2
(45) Date of Patent: Jul. 4, 2023

(54) SYSTEM FOR AN ELECTRICALLY DRIVEN VEHICLE, VEHICLE HAVING SAME AND METHOD FOR SAME

(71) Applicant: WABCO GMBH, Hannover (DE)

(72) Inventors: Gerd Schuenemann, Laatzen (DE); Johannes Heseding, Hannover (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 303 days.

(21) Appl. No.: 17/055,155

(22) PCT Filed: May 13, 2019

(86) PCT No.: PCT/EP2019/062128
§ 371 (c)(1),
(2) Date: Nov. 13, 2020

(87) PCT Pub. No.: WO2019/219558
PCT Pub. Date: Nov. 21, 2019

(65) Prior Publication Data
US 2021/0188098 A1    Jun. 24, 2021

(30) Foreign Application Priority Data
May 15, 2018 (DE) .................. 10 2018 111 682.9

(51) Int. Cl.
*B60L 15/20* (2006.01)
*B60T 8/1755* (2006.01)
(Continued)

(52) U.S. Cl.
CPC .......... *B60L 15/2009* (2013.01); *B60L 3/108* (2013.01); *B60L 7/26* (2013.01); *B60T 8/1755* (2013.01);
(Continued)

(58) Field of Classification Search
CPC ........ B60L 3/108; B60L 7/26; B60L 15/2009; B60L 2240/423; B60L 2240/465;
(Continued)

(56) References Cited

U.S. PATENT DOCUMENTS

| | | | |
|---|---|---|---|
| 6,684,146 B1 | 1/2004 | Hedenetz | |
| 10,272,925 B1 * | 4/2019 | Wicks | B60W 10/02 |

(Continued)

FOREIGN PATENT DOCUMENTS

| | | | | |
|---|---|---|---|---|
| CN | 202944292 U | * | 5/2013 | ............ B60T 8/1755 |
| CN | 103448635 A | * | 12/2013 | |

(Continued)

OTHER PUBLICATIONS

Bannatyne, Ross, "TTP/C multiplexed communication for fault-tolerant automotive systems", SAE Transactions, vol. 108, Section 6: Journal of Passenger Cars, Part 2(1999), pp. 3212-3216 (Year: 1999).*

(Continued)

*Primary Examiner* — David A Testardi
(74) *Attorney, Agent, or Firm* — Leydig, Voit & Mayer, Ltd.

(57) ABSTRACT

A system for an electrically driven vehicle includes at least one motor controller configured to control at least one electric motor, with which at least one drive wheel of the vehicle can be driven. The system further includes at least one brake controller configured to control friction brakes, with each of which one of multiple drive wheels and/or non-driven wheels can be braked. The brake controller and the electric motor controller each have a data interface that is a bus interface. The brake controller and the electric motor controller are set up to send and/or receive data with a predefined maximum data transmission rate via the first data interface. The brake controller and the electric motor each (Continued)

have a second data interface, each second data interface being designed to send and/or receive data with a higher data transmission rate than the maximum data transmission rate of the first data interface.

14 Claims, 2 Drawing Sheets

(51) Int. Cl.
　　*B60L 3/10*　　　　(2006.01)
　　*B60L 7/26*　　　　(2006.01)
(52) U.S. Cl.
　　CPC ... *B60L 2240/423* (2013.01); *B60L 2240/465* (2013.01)
(58) Field of Classification Search
　　CPC ............ B60T 8/1755; B60T 2270/603; B60T 2270/613; B60T 2270/602; B60T 2270/604; B60T 8/174; Y02T 10/72; G06F 11/2007; G06F 11/2012
　　See application file for complete search history.

(56) References Cited

U.S. PATENT DOCUMENTS

| | | | |
|---|---|---|---|
| 2003/0043750 A1* | 3/2003 | Remboski | H04L 45/24 370/242 |
| 2008/0296106 A1* | 12/2008 | Nilsson | B60T 8/345 701/115 |
| 2014/0375115 A1* | 12/2014 | Ajiro | B60T 1/10 303/152 |
| 2015/0284005 A1* | 10/2015 | Suzuki | B60T 8/175 701/22 |
| 2017/0106755 A1 | 4/2017 | Nakatsu | |
| 2017/0250905 A1* | 8/2017 | Park | H04L 45/66 |
| 2017/0272260 A1* | 9/2017 | Han | G01R 19/165 |
| 2017/0288951 A1* | 10/2017 | Kurauchi | H04L 43/0811 |
| 2017/0334437 A1* | 11/2017 | Mikami | B60W 20/50 |

FOREIGN PATENT DOCUMENTS

| | | | | |
|---|---|---|---|---|
| DE | 19918995 A1 | | 11/2000 | |
| DE | 102009030816 A1 | * | 11/2010 | ............ B60T 8/1755 |
| DE | 102009030816 A1 | | 11/2010 | |
| EP | 2562026 A1 | * | 2/2013 | .......... B60L 11/1805 |
| EP | 3031663 A1 | | 6/2016 | |
| JP | 2006290133 A | * | 10/2006 | |
| JP | 2006327271 A | * | 12/2006 | |
| JP | 2014118072 A | * | 6/2014 | |

OTHER PUBLICATIONS

Parnell, Karen, "Put the right bus in your car", Xcell Journal, Winter 2004, 5 pages (Year: 2004).*

* cited by examiner

SYSTEM FOR AN ELECTRICALLY DRIVEN VEHICLE, VEHICLE HAVING SAME AND METHOD FOR SAME

CROSS REFERENCE TO RELATED APPLICATIONS

This application is a U.S. National Phase Application under 35 U.S.C. § 371 of International Application No. PCT/EP2019/062128, filed on May 13, 2019, and claims benefit to German Patent Application No. DE 10 2018 111 682.9, filed on May 15, 2018. The International Application was published in German on Nov. 21, 2019, as WO 2019/219558 A1 under PCT Article 21(2).

FIELD

The invention relates to the domain of vehicles that are electrically or hybrid driven. In particular, such vehicles include utility vehicles such as trucks, passenger cars or trailer vehicles.

BACKGROUND

Electrically powered vehicles, especially in the commercial vehicle sector, with an internal combustion engine as the drive have long been known. Such vehicles have often been further developed into hybrid vehicles or the internal combustion engine has been substantially replaced by an electric drive during further development. This means that often no completely new development has been carried out for the provision of electrically driven vehicles, so that existing functions which are primarily not related to the drive itself can continue to be used.

In the case of known vehicles, in particular utility vehicles which are electric, it is therefore provided that the electric drive is used in essence in order to enable or support a positive acceleration of the vehicle. Such vehicles usually have a vehicle control unit. The vehicle control unit is connected to an electric motor control unit via a bus connection and passes an acceleration request via this, which is specified, for example, by a gas pedal position by a driver, to the electric motor control unit. This then switches on the electric drive to provide torque by the electric motors or to support the torque provision according to the specifications of the vehicle control unit.

In addition, an electronically controlled brake system (EBS) of the vehicle is controlled by the vehicle control unit. For this purpose, the brake system, which can also be referred to as a brake control unit, will be sent a signal with a negative acceleration request, i.e. a requested braking, and this signal will be implemented by the friction brakes which are controlled by the brake control unit. A signal with a negative acceleration request is generated, for example, in the vehicle control unit, when braking is requested by a driver via a brake pedal position.

In addition, it is known that in the case of an existing electric drive for supporting braking the vehicle control unit also signals the braking request to the electric motor control unit in order to support braking by an electromagnetic braking operation of the electric drive. This allows electrical energy to be generated with recovered kinetic energy during the braking maneuver which is carried out with the electric drive.

According to the prior art, rapid acceleration changes or torque changes, which are necessary for example in the case of slip control or stability control, are carried out by the electronically controlled brake system itself and only the friction brakes are used here. In particular, wheel-specific intervention possibilities, which are advantageously possible in the case of slip control or stability control by wheel-specifically driven electric motors, as well as energy recovery in the case of slip control or stability control by an electromagnetic brake drive of electric motors, do not therefore take place. However, this would be desirable to enable energy efficiency and to improve slip control or stability control.

SUMMARY

In an embodiment, the present invention provides a system for an electrically driven vehicle. The system includes at least one motor controller configured to control at least one electric motor, with which at least one drive wheel of the vehicle can be driven. The system further includes at least one brake controller configured to control friction brakes, with each of which one of multiple drive wheels and/or non-driven wheels can be braked. The brake controller and the electric motor controller each have a data interface that is a bus interface. The brake controller and the electric motor controller are set up to send and/or receive data with a predefined maximum data transmission rate via the first data interface. The brake controller and the electric motor each have a second data interface, wherein each second data interface is designed to send and/or receive data with a higher data transmission rate than the maximum data transmission rate of the first data interface. The brake controller and the electric motor controller are set up to exchange data via the second data interfaces with a higher data transmission rate than with the first data interfaces.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
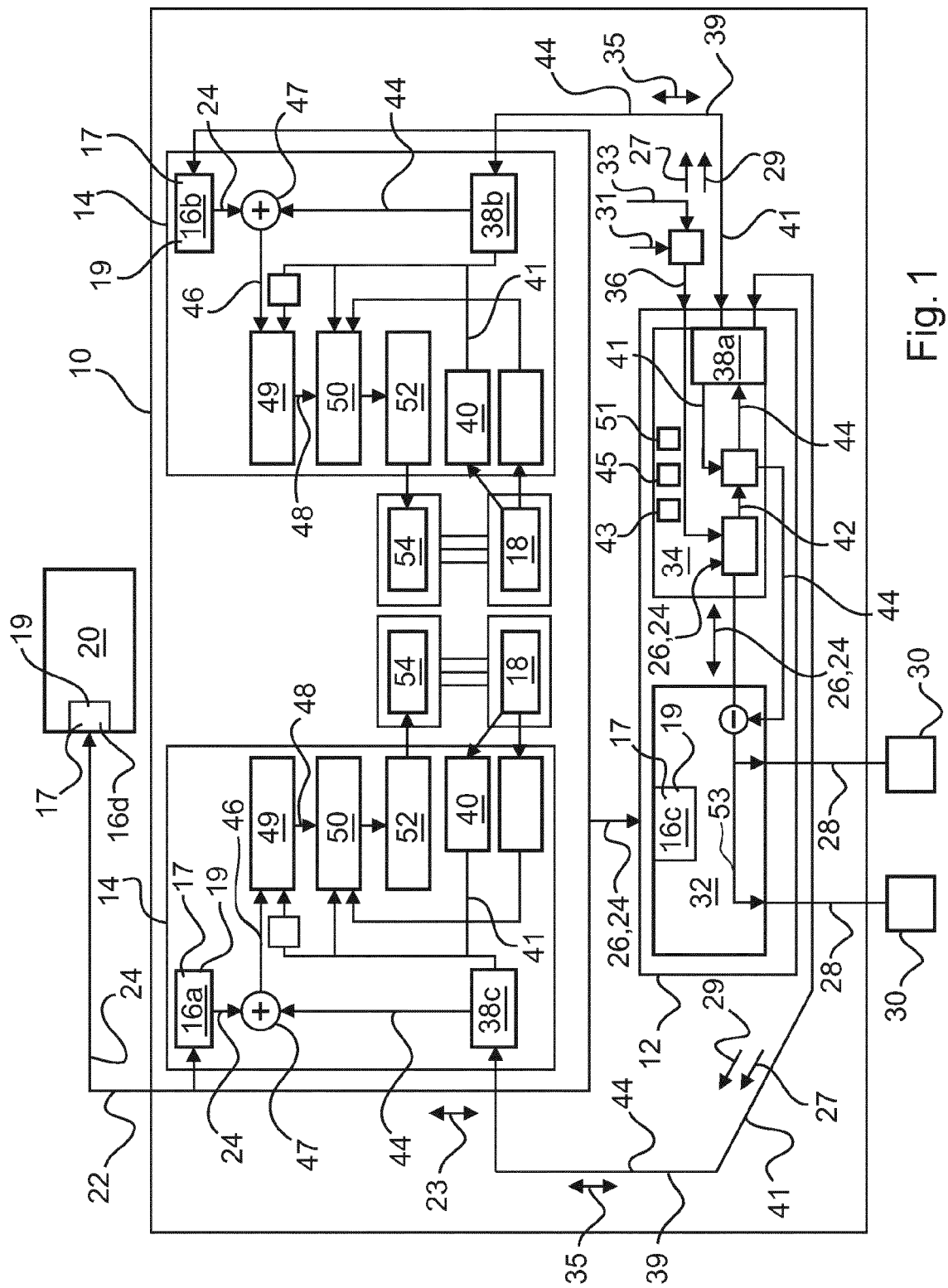
FIG. 1 shows an exemplary embodiment of a system.

The present disclosure provides for a way to also use an electric drive in the highly dynamic situation of positive and negative torque for slip control and stability control, in order in particular also to be able to use the high torque dynamics of electric drives for improved slip control and stability control.

For this purpose, the present disclosure relates to a system for an electrically driven vehicle. The system includes at least one motor control unit and at least one brake control unit. The motor control unit is used to drive at least one electric motor with which at least one drive wheel of the vehicle can be driven. Accordingly, in the case of multiple motors, each electric motor has a motor control unit, or a motor control unit is provided for multiple electric motors.

The brake control unit is used for the control of friction brakes, with each of which one of multiple drive wheels and additionally or alternately one of multiple non-driven wheels can be braked. The brake control unit and the electric motor control unit each have a first data interface. The first data interface is a bus interface. Particularly preferably, the bus interface is a CAN bus interface. The brake control unit and the electric motor control unit are also set up to exchange data via the first data interface. The first data interface has a predefined maximum data transmission rate. The predefined maximum data transmission rate, which can also be called the data transfer rate, data rate or transmission speed, refers to an amount of digital data which can be transmitted over a transmission channel, i.e. over a bus connection, by means of the data interface over a period of time. The maximum data transmission rate can also be called the channel capacity. In particular, in the present case, the predefined maximum data transmission rate results from the use of the data interface as a bus interface with a standardized protocol, such as preferably a CAN protocol.

In addition, the brake control unit and the electric motor control unit each have a second data interface. The second date interfaces are each designed to send and/or receive data with a higher data transmission rate than the maximum data transmission rate of the first data interface. Thus, the brake control unit and the electric motor control unit are set up to exchange data via the second data interface, wherein this can be carried out with a higher data transmission rate than the predefined maximum data transmission rate at which a data exchange can be carried out by means of the first data interface.

This makes it possible to control the electric motor control unit and the brake control unit by a vehicle control unit with a bus system via the first data interface, for example to transmit a positive or negative acceleration request of a driver to one or both of the control units, so that these can be used accordingly for accelerating or braking the vehicle. In particular, the brake control unit and the electric motor control unit can also exchange data via the first data interface. For example, a braking request of a driver, which has been passed to the brake control unit from the vehicle control unit via the first data interface, can therefore be supported by the brake control unit requesting braking support via the first data interface to the electric motor control unit by a braking operation of the electric motor or the electric motors, which can be controlled by the electric motor control unit.

In addition, however, the system has a motor control unit and a brake control unit, each with a second data interface, which allows a comparatively higher data transmission rate than the first date interface and thus a data exchange between the control units with a higher data transmission rate than with the first date interface. Highly dynamic torque change requests of an electrically driven motor can thus be generated centrally by the brake control unit and transferred directly to the electric motor control unit. This makes it possible to include the electric motors in the event of highly dynamic torque changes. Another advantage is that two data connections can also be used to exchange redundant data between the electric motor control unit and the motor control unit, thus increasing reliability.

According to a first embodiment, the motor control unit is set up to control multiple electric motors of an electrically driven vehicle, with each of which one of multiple drive wheels of the vehicle can be driven. Alternatively, multiple motor control units are provided, each of which drives an electric motor. Wheel-specific drives of a vehicle, which are individually controlled by the motor control unit, can thus be used via the second data interface and thus a second data connection between the motor control unit and the brake control unit in order to be able to use the electric motors wheel-specifically to support different driving situations. A significant improvement is therefore possible, in particular of a wheel-specific drive in the event of torque requests triggered by the brake control unit in exceptional driving situations, so that driving safety is improved.

According to a further embodiment, the motor control unit is set up, preferably continuously or at intervals, to determine a maximum currently available positive and/or negative torque value of the electric motor or each of the electric motors, which can be controlled by the motor control unit, and to transfer this via the second data interface to the brake control unit. Thus, a brake control unit, which is usually given a wheel-specific current target torque, for example from a vehicle control unit, also has available further information about maximum currently available positive or negative torque values of the electric motor or each of the electric motors. Thus, the brake control unit may, in the case of control of the electric motors by means of the motor control units, take into account maximum values for the control of the motor control unit when generating the control signals for the motor control unit on the one hand, and on the other hand for the generation of control signals for the control of the friction brakes. Maximum available positive or negative torque value of each of the electric motors, i.e. maximum realizable torque values in a specific driving situation, depend on the revolution rate, i.e. the vehicle speed, the state of charge of a battery driving the electric motors and the component temperatures of an electric drive comprising the electric motors. These state variables are calculated in the electric motor control unit taking into account known electric motor machine parameters for the control of the electric motors and other measured values. Such measurement values are, for example, the motor position, the phase current of at least two phases and/or the phase voltage.

According to a further embodiment, the brake control unit has at least one safety system which is set up, in particular in the case of activation of the safety system, to generate target torques for at least one of the wheels of the vehicle or respective target torques for all wheels of the vehicle.

In addition, the brake control unit is set up to derive differential torques from the target torques for the electric motor or each of the electric motors. Accordingly, the brake control unit, especially on activation of the safety system, generates control signals not only for friction brakes of the vehicle, but also for the electric motors. These are called differential torques. Preferably, these differential torques are to be understood as differential torques between a current torque of an electric motor and a requested higher or lower torque of the motor. In particular, when a safety function is performed by the safety system of the brake control unit, torque changes of the electric motors are generated directly in the brake control unit by the brake control unit and can be used thanks to fast transmission via the second data interface from the motor control unit to change the control of the electric motors. Increased safety in critical driving situations where a safety system is activated is provided by the highly dynamic switching on of electric motors. In addition, an increase in efficiency is also possible, since in particular electrical energy can be generated by generator braking of the electric motors, even in the case of functions carried out with a safety system.

According to a further embodiment, the safety system of the brake control unit comprises a drive slip control and/or an anti-lock system and/or an electronic stability program.

The drive slip control (ASR) can also be called automatic slip control or traction control. The drive slip control ensures that the wheels do not spin when starting up or on poor ground. Thus if slip of the drive wheels is threatened, the drive torque is preferably regulated by targeted withdrawal of the drive torque and optionally additional, preferably wheel-specific braking. The anti-lock system (ABS) is sometimes referred to as an automatic locking preventer (ABV). When braking, the anti-lock system counteracts possible locking of the wheels, in particular by reducing the braking pressure of the friction brakes, so that better steering or lane fidelity is carried out. In addition, the wheel slip can be regulated, so that a braking distance can be shortened on a wet road, for example. The ABS controls the wheel slip in such a way that the maximum force can be exchanged between the wheel and the road. This will reduce the braking distance. The driving dynamics control, also known as Electronic Stability Control (ESC) or often electronic stability program (ESP), is used to counteract vehicle swerving by means of targeted braking.

Preferably, according to this embodiment, all of the safety systems mentioned are integrated in the brake control unit and, thanks to the second data interface, these safety systems can generate torque changes on the drive wheels by controlling the electric motors by generating the differential torques for the electric motors in addition to the generation of a braking force with the friction brakes.

Improved safety and improved control accuracy and control speeds are thus possible.

According to a further embodiment, the brake control unit is set up to limit a differential torque for the electric motor depending on the maximum value of the currently available positive and/or negative torque. In the case of multiple electric motors, the brake control unit is set up to limit the differential torques for each of the electric motors depending on the respective maximum values of the currently available positive and/or negative torques of the respective motor.

Accordingly, the maximum values of the available torque previously supplied to the brake control unit are used to limit the differential torques generated in the brake control unit, so that it can be taken into account directly in the brake control unit to what extent the electric motors can have an influence on an acceleration change, in particular in the case of an intervention by the safety system. Accordingly, the friction brakes can then also be controlled in addition. Thus, it is ensured that the brake control unit never expects or takes into account a greater torque change from the electric motor or the electric motors in the event of an intervention than can actually be provided by the respective electric motor or electric motors.

According to a further embodiment, the brake control unit is set up to generate differential torques with a negative torque value or a positive torque value. Thus, the brake control unit is enabled, in particular in the case of a safety function carried out by a safety system, not only to brake the existing torque exerted on the wheels, but also to accelerate it. This can, in particular, lead to improved vehicle driving safety when operating an electronic stability program. In particular, in the case of the use of multiple electric motors, not only is wheel-specific braking possible, but also wheel-specific acceleration to support driving safety.

According to a further embodiment, the brake control unit is set up to generate braking torques for the control of the friction brakes of the respective drive wheels in the case of a limited differential torque for the electric motor or each of the electric motors. A braking torque for a drive wheel preferably comprises a difference between the target torque for the drive wheel and the limited differential torque for the electric motor of the drive wheel. In particular, if a drive wheel is to be braked, a differential torque for the electric motor of the wheel is first determined based on the target torque calculated by the brake control unit and the maximum possible torque of the motor. If the specified value is equal to the maximum value, it can be seen that a maximum braking torque of the motor is used, but moreover a greater braking torque is required. A corresponding braking torque is then generated by forming the difference for the friction brakes and the corresponding friction brake is thus controlled with this difference value by the brake control unit.

For braking, it is first prioritized to brake the drive wheels as strongly as possible by the motor and the friction brakes are only then used to support the braking. Thus, sufficient braking is always possible with the electric motors using maximum energy recovery.

According to a further embodiment, the brake control unit is set up to transmit the differential torques via the second data interface to the electric motor control unit. The electric motor control unit is set up to overlay the differential torques received via the second data interface with current target torque values, which are preferably received via the first data interface from a vehicle control unit. The electric motor control unit is therefore designed in such a way as to take into account not only target torque values specified by a vehicle control unit when controlling one or more of the electric motors, but also the differential torques generated in the brake control unit.

According to a further embodiment, the electric motor control unit has an overlay element, which is preferably an addition element, for overlaying the difference torques for the electric motor or each of the electric motors on the or the respective current target torque value for the respective electric motor, in particular by addition. A simple realization of an overlay is possible in particular by addition.

According to a further embodiment, the system is set up to activate the safety system when detecting a slip value of at least one wheel which is above a predefined threshold value, and to generate measures to reduce the slip value by generating target torques for at least one or more of the drive wheels and/or non-driven wheels. There is no interaction with the vehicle control unit or other control units in this case.

A fast data exchange is therefore only necessary between the brake control unit and the motor control unit, so that the addition of a second data interface for further control units, in particular for the vehicle control system, is not necessary. In addition, the vehicle control unit does not need to be used when triggering safety measures, so that it is not necessary to change the functionality of the vehicle control unit in order to integrate the existing system into a vehicle.

In addition, the present disclosure provides a vehicle which is in particular a utility vehicle, such as a truck. The vehicle comprises a system according to any one of the aforementioned embodiments.

According to a particular embodiment of the vehicle, the vehicle comprises a vehicle control unit comprising a first data interface, which is a bus interface. Preferably, the bus interface is a CAN bus interface. In addition, the vehicle control unit is set up to send target torque values to the electric motor control unit via the first data interface of the vehicle control unit to the first data interface of the electric motor control unit. Furthermore, the vehicle control unit is set up to send target torque values to the brake control unit via the first data interface of the vehicle control unit to the first data interface of the brake control unit.

According to a further embodiment of the vehicle, it comprises multiple driven wheels, each with an electric motor, each of which can be individually operated with an individual torque by one or a respective electric motor control unit.

In addition, the present disclosure provides a method for operating a vehicle according to any one of the aforementioned embodiments or a system according to any one of the aforementioned embodiments.

FIG. 1 shows a system 10 according to an exemplary embodiment. The system 10 comprises one brake control unit 12 and two motor control units 14. The brake control unit 12 as well as the motor control units 14 each have a first data interface 16a, 16b, 16c. The first data interface 16a, 16b, 16c is a bus interface 17, in particular a CAN bus interface 19, and can therefore also be referred to as a CAN-bus-interface. The motor control units 14 are each used for driving an electric motor 18. A drive wheel of a vehicle can be driven by each electric motor 18. In the present case, according to this exemplary embodiment, two motor control units are shown, each controlling an electric motor 18, wherein according to another exemplary embodiment, which is not shown here, also a single motor control unit 14 is provided to control multiple electric motors 18. In addition, a vehicle control unit 20 is shown, which also has a first data interface 16d. The vehicle control unit 20 is set up to transfer target torque values 24 for the electric motors 18 to the motor control units 14 via a bus connection 22 and the first data interfaces 16a, 16b, 16d. The bus connection has a predefined maximum data transmission rate 23.

In addition, the vehicle control unit 20 is set up to transmit a negative acceleration request 26, i.e. a braking request, to the brake control unit 12. In the case of a negative acceleration request 26 specified by the vehicle control unit 20, the brake control unit produces 12 braking torques 28 for friction brakes 30 of the vehicle. This is done with a first function block 32 of the brake control unit 12. A second function block, which is referred to here as a safety system (also called a safety circuit) 34, of the brake control device 12 receives this negative acceleration request 26 also, wherein additionally a slip or a slip signal 36 of one or more of the wheels of the vehicle is fed to this function block 34. The slip signal 36 is calculated or determined in the brake control unit 12 itself according to an alternative exemplary embodiment. The brake control unit 12 or, as shown here another function block, receives slip values 31 for each of the wheels. This is done by measuring or calculating the vehicle speed and the wheel revolution rate. The slip values 31 are compared with at least one predefined threshold value 33. For example, the slip signal 36 is generated when the threshold value 33 is exceeded by a slip value 31.

The brake control unit 12 also has a second data interface 38a, which is connected to second data interfaces 38b, 38c of the motor control units 14 via a data line 39. The data line 39 to which the second data interfaces 38a-38c are connected has a data transmission rate 35, which is higher than the maximum data transmission rate 23 of the bus connection 22, to which the first data interfaces 16a-16c are connected. By means of the second data interface 38a, the brake control unit receives 12, continuously or at intervals from the respective motor control unit 14 via a sensor interface 40, provided maximum available positive or negative torque values 41 of the electric motors 18 which are correspondingly connected to the motor control units 14.

In the event of a slip signal 36 occurring, the safety system 34 is activated in the brake control unit 12 and target torques 42 are generated for each wheel of the vehicle. These target torques 42 are converted into differential torques 44, taking into account the maximum currently available positive or negative torque values 41, which are each fed via the second data interfaces 38a to the corresponding data interfaces 38b, 38c of the motor control units 14. The differential torques 44 can include positive torque values 27 or negative torque values 29. The differential torque values 44 are accordingly overlaid on the target torque values 24, which are present in the respective motor control unit 14, and thereby a specified torque value 46 is determined. This is done by an overlay element 47, which is an addition element (also called an adder) 47 here. A signal 48 is generated in a converter 49 from the specified torque value 46 for controlling a pulse-width modulator 50, which thereby generates a pulse width modulation 52, in order to provide an alternating voltage for the electric motors 18 with inverters 54. In addition, differences 53, i.e. difference values, are formed from each of the target torques 42 and the respective differential torque value 44 for an electric motor 18 to generate braking torques 28 for the friction brakes 30.

The safety system 34 can thus intervene directly in the control of the electric motors 18. Preferably, the safety system 34 comprises a drive slip control 43, an anti-lock system 45 and an electronic stability program 51.

Figure 2:
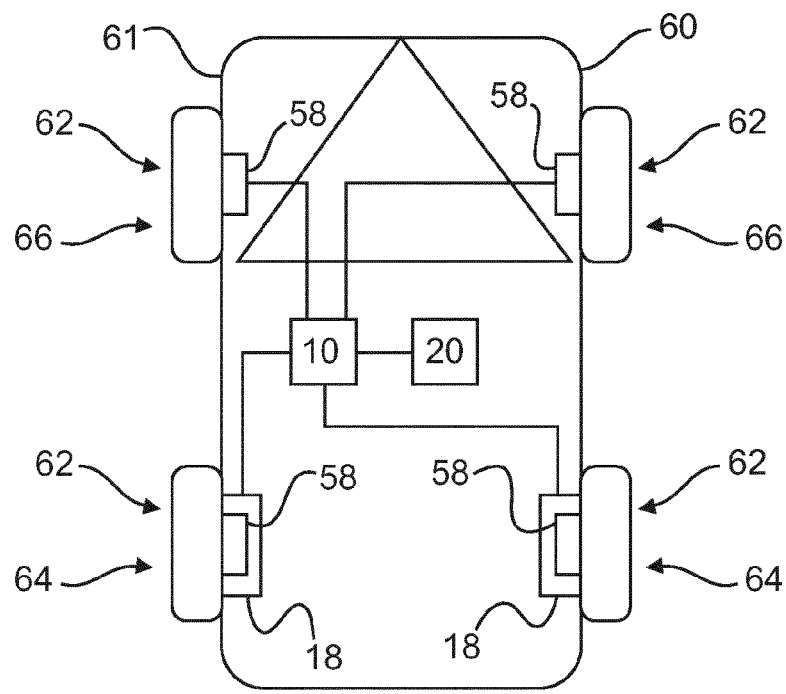
FIG. 2 shows an exemplary embodiment of a vehicle.

FIG. 2 shows an exemplary embodiment of a vehicle 60, which has four wheels 62. The vehicle 60 is a utility vehicle 61. Two of the wheels 62 are drive wheels 64 and two of the wheels 62 are non-driven wheels 66. The drive wheels 64 each have an electric motor 18. Each of the wheels 62 also has a friction brake 58. In addition, the vehicle 60 comprises a system 10 and a vehicle control unit 20.

Figure 3:
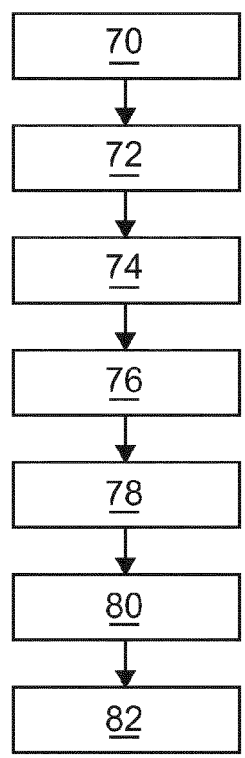
FIG. 3 shows an exemplary embodiment of a method.

FIG. 3 shows the steps of a method according to an exemplary embodiment. In one step 70, a brake control unit 12 calculates a slip signal 36, which indicates the slip 36 of one or more wheels 62 of the vehicle 60. In step 72, a safety system 34 of the brake control unit 12 is activated and in step 74 target torques 42 for each of the wheels 62 are determined. In step 76 differential torques 44 for the electric motors 18 of the drive wheels 64 are generated from the target torques 42, wherein here in step 78 the differential torques 44 are transmitted via a second data interface 38a of the brake control unit 12 to the electric motor control unit 14. In step 80, the differential torques 44 are overlaid on target torque values 24 of the corresponding electric motors 18 and in step 82 the electric motors 18 are each controlled with the overlaid target torque values 24.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 10 system
12 brake control unit
14 motor control units
16a-16b first data interface of the motor control unit
16c first data interface of the brake control unit
16d first data interface of the vehicle control unit
17 bus interface
18 electric motor
19 CAN-bus interface
20 vehicle control unit
22 bus connection
23 data transmission rate
24 target torque values
26 negative acceleration request
27 positive torque value
28 braking torques
29 negative torque value
30 friction brakes
31 slip value
32 first function block
33 threshold value
34 safety system
35 data transmission rate
36 slip signal
38a second data interface of the brake control unit
38b-38c second data interfaces of the motor control unit
39 data line
40 sensor interface
41 maximum currently available positive or negative torque value
42 target torque
43 drive slip control
44 differential torque
45 anti-lock system
46 specified torque value
47 overlay element
48 signal
49 converter
50 modulator
51 electronic stability program
52 pulse width modulation
53 differences
54 inverter
58 friction brake
60 vehicle
61 utility vehicle
62 wheels
64 drive wheels
66 non-driven wheels
70-82 steps of the method

The invention claimed is:

1. A system for an electrically driven vehicle, the system comprising:
at least one electric motor controller configured to control at least one electric motor, with which at least one drive wheel of the vehicle can be driven, and
at least one brake controller configured to control friction brakes, with each of which one of multiple drive wheels and/or non-driven wheels can be braked,
wherein the brake controller and the electric motor controller each have a first data interface that is a bus interface,
wherein the brake controller and the electric motor controller are set up to send and/or receive data with a predefined maximum data transmission rate via the first data interface,
wherein the brake controller and the electric motor controller each have a second data interface, wherein each second data interface is designed to send and/or receive data with a higher data transmission rate than the maximum data transmission rate of the first data interface,
wherein the brake controller and the electric motor controller are set up to exchange data via the second data interface with a higher data transmission rate than with the first data interface,
wherein the brake controller comprises at least one safety circuit, which is set up, in a case of activation of the safety circuit, to generate a respective target torque for at least one electric motor of the vehicle or all electric motors of the vehicle and the brake controller is set up to derive a respective differential torque from the target torque for the electric motor or for each of the electric motors,
wherein the target torque indicates a desired electric motor torque output for a respective electric motor or all electric motors of the vehicle, and
wherein the differential torque indicates a difference between the respective target torque and a respective current torque output of the electric motor or all electric motors of the vehicle.

2. The system as claimed in claim 1, wherein the at least one motor controller is set up to control a plurality of motors.

3. The system as claimed in claim 1, wherein the at least one motor controller is set up to determine a maximum currently available positive and/or negative torque of the electric motor or each of the electric motors and to transfer it via the second data interface to the second data interface of the brake controller.

4. The system as claimed in claim 1, wherein the safety circuit comprises a drive slip control and/or an anti-lock system and/or an electronic stability program.

5. The system as claimed in claim 1, wherein the brake controller is set up to limit the differential torque for the electric motor or each of the electric motors depending on a respective maximum currently available torque value of the electric motor or each of the electric motors, wherein each respective maximum currently available torque value may be positive or negative.

6. The system as claimed in claim 1, wherein the brake controller is set up to generate a differential torque with a negative torque value or a positive torque value.

7. The system as claimed in claim 1, wherein the brake controller is set up, in a case of a limited differential torque for the electric motor or each of the electric motors, to generate a braking torque for control of the friction brakes of the drive wheels, wherein the braking torque for a drive wheel comprises a difference between a target torque for the respective drive wheel and the limited differential torque for an electric motor of the respective drive wheel.

8. The system as claimed in claim 1, wherein the brake controller is set up to transmit the differential torque via its second data interface to the second data interface of the electric motor controller and the electric motor controller is set up to add the differential torque received via the second data interface from the second data interface of the brake controller and a target torque, which is received via the first data interface from a vehicle controller.

9. The system as claimed in claim 1, wherein the electric motor controller has an electronic adder, wherein the electronic adder is set up to add a respective differential torque value to a target torque value for the electric motor or the electric motors.

10. The system as claimed in claim 1, wherein the safety circuit is set up, on detecting a slip value of at least one wheel above a predefined threshold value, to reduce the slip value without receiving a slip control signal from the at least one electric motor controller or from the at least one brake controller.

11. A vehicle, comprising a system as claimed in claim 1.

12. The vehicle as claimed in claim 11, wherein the vehicle comprises a vehicle controller comprising a first data interface, which is a bus interface, and the vehicle controller is set up to send target torque values to the at least one electric motor controller via the first data interface of the vehicle controller to the first data interface of the motor controller and is set up to send target torque values to the brake controller via the first data interface of the vehicle controller to the first data interface of the brake controller.

13. The vehicle as claimed in claim 11, wherein the vehicle has an electric drive for each of the drive wheels.

14. A method for operating a vehicle as claimed in claim 11, the method comprising:
   generating the differential torque with the brake controller and transmitting the differential torque with the second data interface of the brake controller to the second data interface of electric motor controller; and
   adding a respective target torque value of an electric motor controlled by the electric motor controller to the differential torque.

* * * * *